UNITED STATES PATENT OFFICE.

PAUL J. MEYER, OF BERLIN, GERMANY.

MANUFACTURE OF ISATINS AND SUBSTITUTED ISATINS.

SPECIFICATION forming part of Letters Patent No. 310,604, dated January 13, 1885.

Application filed May 28, 1883. (No specimens.) Patented in Germany March 2, 1883, No. 25,136; in England April 9, 1883, No. 1,788; in Belgium April 9, 1883, No. 61,020, and in France April 9, 1883, No. 154,756.

*To all whom it may concern:*

Be it known that I, PAUL JOACHIM MEYER, doctor of philosophy, a subject of the King of Prussia, residing at Berlin, Prussia, German Empire, have invented certain new and useful Improvements in the Manufacture of Coloring Matters; and I do hereby declare the following to be a full, clear, and exact description of the invention, such as will enable others skilled in the art to which it appertains to make and use the same.

This invention relates to the production of isatins or substitutes of isatins and their conversion into indigo or substitutes of indigo.

In experiments on the reaction of halogenized acetic acids upon aromatic amines or substituted amines I have discovered that by the reaction of a dihalogenized acetic acid or a derivative thereof upon said amines products are obtained which may readily be converted into isatins—as, for example, aniline into isatin which is identical with the known isatin, toluidine into methylisatin, &c. If, for instance, it is desired to convert paratoluidine into paramethylisatin, I take one hundred parts, by weight, of paratoluidine and about thirty parts, by weight, of dichloracetic acid, (four molecules of paratoluidine and one molecule of dichloracetic acid,) and heat the compound. These proportions may be varied without thereby affecting the reaction; yet I have found that a material deviation from these proportions tends to diminish the product. The heating may with proper precautions be effected upon an open fire or in a water bath, or, by preference, by digestion, after adding a solvent, such as alcohol, benzole, and even water. The operation is completed in from three to four hours, and the completion may be readily detected by the profuse presence of the hydrochloric acid combined with the paratoluidine. The reagent obtained in this manner is then preferably subjected to oxidation. For this purpose I again dissolve the product obtained from the hydrochloric acid paratoluidine by lixiviation or precipitation with water, and oxidize the same by the addition of a feeble oxidizing agent, or simply by exposure to the atmosphere. From the clear solution crystals or crystalline crusts are separated, which are composed of paratoluilated paramethylisatin, one atom of oxygen of which is substituted by the remaining paratoluidine. By treating the paratoluilated paramethylisatin with strong acids (with hydrochloric acid at ordinary temperatures) or with alkalies, the paratoluidine is separated under absorption of water and paramethylisatin is obtained as a product.

So far as I am aware methylisatin has heretofore not been produced, nor have truly substituted isatins been produced. I am aware, however, that so-called "methylisatin," or "methylbromisatins," or "methyliodisatins," &c., have been produced. They are, however, only ethers of isatins. In some cases the substitution takes place in the aromatic core, ($C_6H_4$,) the H being substituted by methyl $CH_3$. In other cases the substitution takes place in the lateral chain, $CH_3$ being substituted for H in the COH group. The difference between these products and true methylisatin may be readily seen from the following formula:

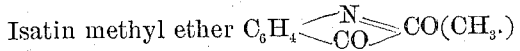

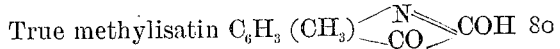

as obtained by my process, and the same difference is naturally found in the artificial methyl indigo obtained from these products.

Instead of dichloracetic acids, dibrom or diiodacetic acids may be employed in the following proportions: one hundred parts, by weight, of paratoluidine, and about fifty-five parts, by weight, of dichloracetic acid, or one hundred parts, by weight, of paratoluidine, and about seventy-three parts, by weight, of diiodacetic acid.

Instead of free acids, their salts, ethers, amides, and aldehydes may be employed as primary agents in the production of paramethylisatin, the steps of the process being the same as above described. The paramethylisatin possesses the same properties as the ordinary isatin. It crystallizes from alcohol or acetic acid in deep red crystals, from water in brilliant red lamellæ, and forms a deep red solution in sulphuric acid. By conversion of the paramethylisatin into a chloride and subsequent reduction paramethyl indigo is obtained, which in its general properties is like the natural indigo. It shows copper glance when subjected to friction, forms a blue solution in heated concentrated sulphuric acid, and is adapted for use the same as the natural indigo.

By the process described results similar to those obtained in the treatment of paratoluidine with a dihalogenized acetic acid or a derivative thereof may be obtained from the reaction of said acid or derivatives upon aniline, ortho, and metatoluidine, xylidine, amidine, naphthylamine, their alkyled or halogenized substitution products and the corresponding amines, producing, in the manner described, isatin, ortho, and metamethylisatin, dimethylisatin, &c., the general properties of which do not materially differ from the ordinary isatin.

The process of obtaining, as well as the formation of their substituted isatins, is carried out and takes place in a manner entirely analogous to that above described, and in their treatment one molecule of acid or ether or aldehyde is preferably mixed with four molecules of the base or one molecule of the salt or amide with three molecules of the base.

I am aware that artificial indigo has prior to my invention been obtained from isatin, and I do not desire to claim such, broadly.

Having now described my invention, what I claim is—

The herein-described process of obtaining isatins or substitutes of isatins from dihalogenized acetic acids, their salts, amides, ethers, and aldehydes, or from the specified amines, by directly fusing or boiling their solutions and by treating the product with a strong acid.

In testimony whereof I affix my signature in presence of two witnesses.

PAUL J. MEYER.

Witnesses:
  GEORGE LOUBIER,
  B. ROI.